United States Patent Office 3,369,979
Patented Feb. 20, 1968

3,369,979
PROCESS FOR THE PRODUCTION OF THIOL-CARBOXYLIC ACID-ALLENE ADDUCTS
Alexis A. Oswald, Mountainside, Karl Griesbaum, Elizabeth, and Daniel Noyes Hall, Linden, N.J., assignors to Esso Research and Engineering Company, a corporation of Delaware
No Drawing. Filed May 18, 1964, Ser. No. 368,347
10 Claims. (Cl. 204—162)

This invention relates to a novel method of preparing adducts of allene and to their utilization in novel pesticidal compositions. More particularly, this invention relates to a process for the direct preparation of mono- and di-thiolcarboxylic acid esters by the addition of said acids to allene and to the use of these compositions as nematocides and fungicides.

It is well-known in the art that some organic sulfur-containing compounds possess properties which make them suitable as agricultural chemicals. The importance of these materials has stimulated interest in other compounds which may possess comparable properties and in methods for producing these compounds. Esters of allyl mercaptan and trimethylene bis-thiol, such as allyl thiolacetate, and trimethylene bis-thiolacetate are known prior-art compounds. The monothiol adduct has been conventionally prepared by reacting an allyl halide with a salt of a thiolcarboxylic acid while the diadduct has been prepared by a reaction between trimethylene diol and paratoluene sulfonyl chloride followed by the reaction of the resulting product with the salt of a thiol acid. These reactions involve the use of expensive reagents and do not result in high yields of the desired compounds. The discovery that allyl thiolacetate is an effective nematocide has stimulated the need for a direct method of preparing this compound in a more practical manner.

It is therefore an object of this invention to provide a novel process for the preparation of allyl thiolesters.

It is another object of this invention to provide a novel process for the preparation of trimethylene bis-thiolesters.

Yet another object of this invention is to provide a novel method for killing fungi and nematodes.

It has now been discovered that thiolcarboxylic acids may be added directly to allene by a free-radical mechanism under controlled conditions leading to the mono- and/or bis-thiolcarboxylic acid adduct of allene, as desired. Furthermore, it has now been found that the products of the above-described process may be employed in commercially practical concentrations to destroy fungi and nematodes. More specifically, it has now been found that allyl thiolacetate and trimethylene bis-thiolacetate possess effective fungicidal properties. Furthermore, it has been discovered that trimethylene bis-thiolacetate is a surprisingly effective nematocidal composition which exhibits unexpectedly superior effectiveness in killing nematodes as compared to the previously known allyl thiolacetate nematocidal compositions.

The free radical reaction contemplated by the process of this invention may be schematically represented as follows:

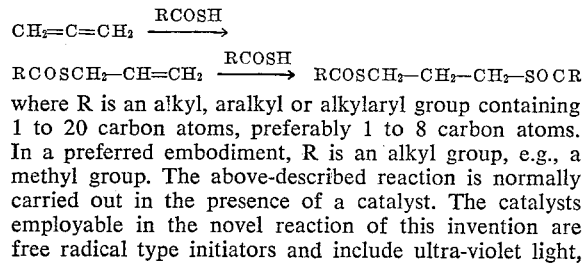

where R is an alkyl, aralkyl or alkylaryl group containing 1 to 20 carbon atoms, preferably 1 to 8 carbon atoms. In a preferred embodiment, R is an alkyl group, e.g., a methyl group. The above-described reaction is normally carried out in the presence of a catalyst. The catalysts employable in the novel reaction of this invention are free radical type initiators and include ultra-violet light, gamma radiation and a wide variety of peroxidic and azo compounds. Typical free radical initiators are cumene hydroperoxide, tertiary butyl hydroperoxide, bis-tertiary butyl peroxide and bis-azo-1 butyronitrile. In one preferred embodiment, a combination of ultra-violet light and a free radical initiator compound are employed as the reaction initiator.

A wide variety of reaction conditions may be employed in the process of the present invention. Suitable reaction temperatures are in the range of $-100$ to $150°$ C., preferably, $-40$ to $100°$ C., for example $15°$ C. The reaction pressure is not critical and superatmospheric as well as atmospheric pressures may be employed in the reaction. Typical reaction pressures are in the range of 0 to 750 p.s.i.g. and preferably 10 to 150 p.s.i.g., for example 50 p.s.i.g.

The ratio of reactants is a critical feature of the invention since the above-described reaction may be carried out in such a manner as to produce either the mono- or diadduct of allene. When the monoadduct is the desired major product of the reaction, the process is normally carried out with an excess of the allene reactant. Suitable molar ratios of allene to thiol acid are in the range of 3:2 to 10:1, preferably 3:1 to 5:1. Furthermore, the production of the monoadduct of allene may be further enhanced by using pressures slightly above atmospheric pressure. For example, in one preferred embodiment, the reaction is carried out in a sealed reaction vessel and the allene vapor pressure is thereby exerted on the system. When the dithiol adduct is the desired major reaction product, the above-described reaction is normally carried out in the presence of an excess of the thiol acid reactant, although equimolar amounts of reactants may be employed. Typically the ratio of the thiol acid to allene is the range of 1:1 to 5:1 and preferably 3:2 to 3:1. In the preferred method for producing the diadduct, allene is introduced into a reaction zone containing the thiol acid and the diadduct is formed as allene is dissolved in the excess of acid.

The invention will be further understood by reference to the following illustrative examples.

*Example 1*

A mixture of 7.6 grams (0.1 mole) of thiolacetic acid, 12 grams (0.3 mole) of allene and 0.045 grams (0.01 mole) of 1-butyl hydroperoxide was irradiated with ultra-violet light in a sealed quartz tube at $15°$ C., for a period of 15 minutes. The reaction mixture was then removed from the quartz tube and subsequent titration with silver nitrate indicated that 92% of the thiolacetic acid had been consumed. Fractional distillation of the reaction mixture yielded 8.5 grams (73 wt. percent) of allyl thiolacetate and 1.7 grams (18 wt. percent) of trimethylene bis-thiolacetate. The example indicates that the reaction of a thiolcarboxylic acid with an excess of allene results in a high yield of the monoadduct.

*Example 2*

Allene was continuously introduced into a reaction zone containing 22.8 grams (0.3 mole) of thiolacetic acid for a period of 18 hours. The reaction zone was irradiated with ultra-violet light and was maintained at a temperature of $15°$ C. The absorption of allene and the decrease of the thiolacetic acid content in the reaction zone indicated at 50% conversion of the acid. Analysis of the reaction mixture after separation of the excess thiolacetic acid indicated a 91 wt. percent yield of trimethylene bis-thiolacetate on the basis of the converted thiolacetic acid. The example indicates that the free radical reaction of allene with excess amounts of the thiol acid results predominantly in the production of the diadduct of allene.

Example 3

0.1 gram portions of allyl thiolacetate and trimethylene bis-thiolacetate were dissolved in a minimal quantity of acetone and then diluted with sterile distilled water so as to obtain 1% and 0.1% solutions of each of the compounds. The respective solutions were then tested for fungicidal effect against Trichophyton interdigitale by the standard pad plate technique employing Difco Sabourand Dextrose Agar medium. The fungicidal effects were measured as zone width (in millimeters) of inhibition of the organism. The results are tabulated below:

| Active Ingredient | Concentration (percent) | Inhibition (mm.) |
| --- | --- | --- |
| Allyl Thiolacetate | 1.0 | 20 |
|  | 0.1 | 9 |
| Trimethylene bis-thiolacetate | 1.0 | 15 |
|  | 0.1 | 6 |

The results indicate the effectiveness of allyl thiolacetate and trimethylene bis-thiolacetate as fungicide.

Example 4

Allyl thiolacetate and trimethylene bis-thiolacetate were tested for effectiveness as nematocides. The respective samples were prepared by mixing 0.41 gram of a dust formulation, containing 10% of the active material, with a gallon of soil. This concentration is equivalent to 100 lbs. of active ingredient per 4 inch acre. Ordinarily, 5 to 400 lbs. of active ingredient per 4 inch acre may be employed. The test was conducted as follows: Meloidogyne sp. nematodes were reared in tomato plant soil medium. Soil for test purposes was inoculated with infected soil and root knots from infected tomato plants. The allyl thiolacetate and trimethylene bis-thiolacetate samples were blended thoroughly with the soil in a V-shell blender. Four one-pint paper pots were used for each treatment with one tomato transplant per pot. After three to four weeks under artificial light and overhead irrigation, the roots of the plants were examined for degree of root knot formation. Inoculated controls normally had about 50–100 root knots per plant. Percent control by the allyl thiolacetate and trimethylene bis-thiolacetate compositions was determined by a comparison of the knot counts on treated and untreated tomato plants. The results of the tests are summarized below:

| Active Ingredient | Percent Control | Phytotoxicity |
| --- | --- | --- |
| Allyl thiolacetate | 0 | None |
| Trimethylene bis-thiolacetate | 95 | None |

The results clearly indicate that trimethylene bis-thiolacetate is an effective nematocidal compound and is strikingly superior to the allyl thiolacetate compound which did not exhibit any control. Furthermore, the results indicate that trimethylene bis-thiolacetate is not phytotoxic to the plants being treated.

The nematocidal and fungicidal compositions of this invention may be employed in either solid or liquid form. When used in solid form, they may be reduced into an impalpable powder and employed as an undiluted dust or they may be admixed with a solid carrier such as clay, talc or bentonite as well as other carriers known in the art. The compositions may also be applied as a spray as such or in a liquid carrier either as a solution in a solvent or as a suspension in a nonsolvent, such as water. Typical solvents are organic compounds such as acetone, ethyl alcohol, benzene, naphtha, etc., although different compounds exhibit different solubilities for the novel compositions. In some instances, it may be preferable to admix the composition with wetting agents so as to be able to secure aqueous emulsions and consequent uniformity of dispersion in the resulting colloidal system. The use of these wetting agents also increases the spreading action of the spray by decreasing its surface tension. This results in the securing of better contact of the spray with the surface being treated and consequently brings the active ingredient into more intimate contact with the parasite life. Suitable wetting agents include the sulfates of long-chain alcohols such as dodecanol and octadecanol, sulfonated amide and ester derivatives, sulfonated aromatic and mixed alkyl aryl derivatives, esters of fatty acids such as the ricinoleic esters or sorbitol and petroleum sulfonates of $C_{10}$ to $C_{20}$ lengths. The nonionic emulsifying agents such as the ethylene oxide condensation products of alkylated phenols may also be used. The compounds of this invention may also be admixed with carriers that are themselves active fungicidal and nematocidal compositions.

It is to be understood that the invention is not limited to the specific examples which have been offered merely as illustrations and that modifications may be made without departing from the spirit of the invention.

What is claimed is:

1. A process for preparing thiolcarboxylic acid esters which comprises reacting a compound having the formula RCOSH, wherein R is a hydrocarbon radical containing 1 to 20 carbon atoms and is selected from the group consisting of alkyl, aralkyl and alkylaryl, with allene at a temperature in the range of −100 to 150° C. in the presence of a free radical catalyst.

2. The process of claim 1 wherein R is an alkyl group.

3. The process according to claim 1 wherein said free radical catalyst is selected from the group consisting of peroxidic compounds and azo compounds.

4. A process for preparing allyl thiolacetate which comprises reacting thiolacetic acid with allene at a temperature in the range of −100 to 150° C. and a pressure of 0 to 750 p.s.i.g. in the presence of a free radical catalyst, the molar ratio of allene to thiolacetic acid being in the range of 3:2 to 10:1.

5. The process of claim 4 wherein the free radical catalyst is ultra-violet light.

6. The process of claim 4 wherein the free radical catalyst is a combination of ultra-violet light and a peroxidic compound.

7. The process according to claim 4 wherein said free radical catalyst is selected from the group consisting of peroxidic compounds and azo compounds.

8. A process for preparing trimethylene bis-thiolacetate which comprises reacting thiolacetic acid with allene at a temperature in the range of −100 to 150° C. in the presence of a free-radical catalyst, the molar ratio of thiolacetic acid to allene being in the range of 1:1 to 5:1.

9. The process according to claim 8 wherein said free radical catalyst is selected from the group consisting of peroxidic compounds and azo compounds.

10. The process according to claim 8 wherein the free radical catalyst is ultraviolet light.

References Cited

UNITED STATES PATENTS

| | | | |
| --- | --- | --- | --- |
| 3,193,583 | 7/1965 | Ladd | 260—609 |
| 3,270,063 | 8/1966 | Fath et al. | 260—455 X |
| 2,134,504 | 10/1938 | Brodersen et al. | 167—22 |
| 2,138,557 | 11/1938 | Plummer | 167—22 |
| 2,212,895 | 8/1940 | Allen | 260—456 |
| 2,439,203 | 4/1948 | Ellingboe | 204—158 |
| 2,950,237 | 8/1960 | Sharp | 204—158 |

HOWARD S. WILLIAMS, *Primary Examiner.*

JOHN H. MACK, *Examiner.*

JULIAN LEVITT, VERA C. CLARKE,
*Assistant Examiners.*